United States Patent

Schitthof

[11] Patent Number: 4,773,745
[45] Date of Patent: Sep. 27, 1988

[54] COMPACT WIDE-ANGLE OBJECTIVE

[75] Inventor: Hiltrud Schitthof, Schweppenhausen, Fed. Rep. of Germany

[73] Assignee: Jos. Schneider Optische Werke Kreuznach GmbH & Co. KG, Bad Kreuznach, Fed. Rep. of Germany

[21] Appl. No.: 92,259

[22] Filed: Sep. 2, 1987

[30] Foreign Application Priority Data

Sep. 2, 1986 [DE] Fed. Rep. of Germany ....... 3629773

[51] Int. Cl.$^4$ .................................................. G02B 9/62
[52] U.S. Cl. ..................................................... 350/464
[58] Field of Search ......................................... 350/464

[56] References Cited

FOREIGN PATENT DOCUMENTS 0148391  5/1981  German Democratic Rep. ..................................... 350/464

Primary Examiner—John K. Corbin
Assistant Examiner—Rebecca D. Gass
Attorney, Agent, or Firm—Herbert Dubno

[57] ABSTRACT

A wide-angle objective of compact construction and comparatively small diameter has its first lens element formed as a convex negative meniscus and its last or sixth lens element formed as a biconcave construction with the fourth lens element being a thick cemented lens.

4 Claims, 3 Drawing Sheets

COMPACT WIDE-ANGLE OBJECTIVE

FIELD OF THE INVENTION

My present invention relates to a photographic wide-angle objective and, more particularly, to a comparatively short wide-angle objective whose field of view is comparatively wide both at small apertures and with larger apertures.

BACKGROUND OF THE INVENTION

Wide angle objectives are, of course, known in the art. Typical of such objectives are those designed in accordance with L. Bertele, which generally provide a symmetrical arrangement of the individual lenses and cemented-lens components or elements.

A disadvantage of such earlier lens systems is that they have a relatively long construction, are comparatively large and bulky and require front and rear lens diameters which are so large that difficulties are encountered in building them into cameras. They also limit the adjustment capabilities of so-called large-format cameras.

OBJECTS OF THE INVENTION

It is, therefore, the principal object of the present invention to provide an improved wide-angle objective, which can be used highly effectively for large-format cameras, in which these drawbacks are eliminated or reduced.

Another object of the invention is to provide an alternative to conventional objectives and which will yield a wide field of view in a compact construction and with good correction for all lens apertures. It is another object of this invention to provide a compact wide-angle objective which can be used as an alternative to a normal objective and compact construction and excellent correction for all apertures as well as an alternative for bulky wide-angle objectives which are dimensionally sensitive and can guarantee sharpness only with stepped-down apertures, the improved objective being of comparatively short construction, using comparatively small lens diameters and nevertheless having excellent sharpness over the full range of apertures and at various distances with an image angle of at least 70° in the fully open state of the lens and of at least 80° with a stepped-down aperture.

SUMMARY OF THE INVENTION

These objects and others which will become apparent hereinafter are attained, in accordance with the present invention in a six-element eight-lens wide angle objective which consists essentially of, from the object side to the image side of the objective:

a first element constituted by a convex negative meniscus first lens L1 with radii $r_1$ and $r_2$ and a thickness along the axis of $d_1$ and a refractive index of $n_1$;

a second positive-meniscus element L2 separated from the first element by a spacing $d_2$ measured along the axis and constituted by a second lens L2a cemented to a third lens L3, the second lens L2 being of refractive index $n_2$ and having radii $r_3$ and $r_4$ and a thickness along the axis of $d_3$, the third lens L2b being of refractive index $n_3$ and having radii $r_4$ and $r_5$ and a thickness along the axis of $d_4$;

a third element L3 separated from the second element by a spacing $d_5$ along the axis and constituted by a positive meniscus fourth lens having radii $r_6$ and $r_7$, a refractive index $n_4$, and a thickness along the axis of $d_6$;

a fourth positive element L4 spaced from the third element along the axis by a spacing $d_6$ and constituted of a fifth lens L4a cemented to a sixth lens L4b, the fifth lens L4a having radii $r_8$ and $r_9$ and being of a thickness $d_8$ along the axis and of a refractive index $n_5$, the sixth lens L4b having radii $r_9$ and $r_{10}$ and being a lens with a refractive index $n_6$ and a thickness along the axis of $d_9$;

a fifth positive meniscus element L5 spaced along the axis by a spacing $d_{10}$ from the fourth element and consisting of a seventh lens with a refractive index $n_7$, radii $r_{11}$ and $r_{12}$ and a thickness $d_{11}$ along the axis; and a sixth negative element L6 in the form of an eighth lens of biconcave configuration, separated by a spacing $d_{12}$ along the axis from the fifth element and having a refractive index $n_8$, radii $r_{13}$ and $r_{14}$ and a thickness $d_{13}$ along the axis, and wherein:

the radius $r_{14}$ is greater than the radius $r_{13}$ of the eight lens and is turned toward an image side of the objective, and the following conditions are also satisfied:

$$(d_2+d_{12}) < (d_8+d_9)/2, \text{ and}$$

$$(d_7+d_8+d_9+d_{10}+d_{11}+d_{12}+d_{13}) > 0.48 D$$

where D is the sum of all of the thicknesses and spacings.

The essential features of the new angle objective of the invention is thus that the first lens element is a negative meniscus convex toward the image side and the six-lens element L6 is biconcave with its larger radius $r_{14}$ turned toward the image side, the objective satisfying the conditions given above. Throughout this description, whenever the summation sign is used, it will be understood to represent D, the total of the lens thicknesses and of the air spacings $d_1$–$d_{13}$.

According to a feature of the invention, the wide-angle objective further satisfies the conditions:

$$n_1 < 1.55$$

$$n_8 < 1.55$$

$$(n_2+n_3+n_4+n_5+n_6+n_7)/6 > 1.62.$$

Best results are obtained when the lenses or lens elements are characterized by the following parameters (where in practical terms the units are mm) for a focal length of 100 units the image distance is 81.9 units, the image angle is 70° for an aperture ratio of 1:5.6 and is 80° for an aperture ratio of 1:11.0, and said radii, thicknesses and spacings are given below in said units:

| | | | |
|---|---|---|---|
| $r_1 = 39.152$ | | | |
| | $d_1 = 2.517$ | $n_1 = 1.4645$ | $\nu_1 = 65.77$ |
| $r_2 = 20.221$ | | | |
| | $d_2 = 3.510$ | | |
| $r_3 = 29.616$ | | | |
| | $d_3 = 6.623$ | $n_2 = 1.7550$ | $\nu_2 = 52.30$ |
| $r_4 = 87.298$ | | | |
| | $d_4 = 4.967$ | $n_3 = 1.6254$ | $\nu_3 = 35.56$ |
| $r_5 = 29.998$ | | | |
| | $d_5 = 7.000$ | | |
| $r_6 = 48.217$ | | | |
| | $d_6 = 1.987$ | $n_4 = 1.7725$ | $\nu_4 = 49.60$ |
| $r_7 = 55.911$ | | | |
| | $d_7 = 3.312$ | | |
| $r_8 = 321.496$ | | | |
| | $d_8 = 19.312$ | $n_5 = 1.6204$ | $\nu_5 = 60.33$ |
| $r_9 = -19.009$ | | | |

-continued

| | | | |
|---|---|---|---|
| $r_{10} = -27.981$ | $d_9 = 1.987$ | $n_6 = 1.6668$ | $\nu_6 = 33.01$ |
| $r_{11} = -117.436$ | $d_{10} = 0.338$ | | |
| $r_{12} = -44.848$ | $d_{11} = 5.841$ | $n_7 = 1.6204$ | $\nu_7 = 60.33$ |
| $r_{13} = -28.475$ | $d_{12} = 2.583$ | | |
| $r_{14} = 131.465$ | $d_{13} = 2.517$ | $n_8 = 1.4787$ | $\nu_8 = 58.70$ |
| | $\Sigma d = 62.494$ | | | wherein $\nu_1$ to $\nu_8$ are the Abbe numbers of the first, second, third, fourth, fifth, sixth, seventh and eight lenses, respectively, and $\Sigma d$ is the sum D of all of said thicknesses and spacings.

Alternatively the objective conforms to the parameters (also with the units being mm):

for a focal length of 100 units the image distance is 79.98 units, the image angle is 70° for an aperture ratio of 1:5.6 and is 80° for an aperture ratio of 1:11.0, and the radii, thicknesses and spacings are given below in the units:

| | | | |
|---|---|---|---|
| $r_1 = 40.585$ | $d_1 = 2.512$ | $n_1 = 1.4645$ | $\nu_1 = 65.77$ |
| $r_2 = 20.329$ | $d_2 = 2.942$ | | |
| $r_3 = 28.243$ | $d_3 = 6.611$ | $n_2 = 1.7550$ | $\nu_2 = 52.30$ |
| $r_4 = 78.065$ | $d_4 = 4.958$ | $n_3 = 1.6254$ | $\nu_3 = 35.56$ |
| $r_5 = 29.234$ | $d_5 = 6.988$ | | |
| $r_6 = 48.279$ | $d_6 = 1.983$ | $n_4 = 1.7725$ | $\nu_4 = 49.60$ |
| $r_7 = 61.979$ | $d_7 = 3.303$ | | |
| $r_8 = 735.997$ | $d_8 = 19.278$ | $n_5 = 1.6180$ | $\nu_5 = 63.40$ |
| $r_9 = -18.981$ | $d_9 = 1.983$ | $n_6 = 1.6668$ | $\nu_6 = 33.01$ |
| $r_{10} = -27.595$ | $d_{10} = 0.337$ | | |
| $r_{11} = -100.513$ | $d_{11} = 5.831$ | $n_7 = 1.6180$ | $\nu_7 = 63.40$ |
| $r_{12} = -44.952$ | $d_{12} = 2.578$ | | |
| $r_{13} = -27.416$ | $d_{13} = 2.512$ | $n_8 = 1.4645$ | $\nu_8 = 65.77$ |
| $r_{14} = 158.107$ | $\Sigma d = 61.816$ | | | wherein $\nu_1$ to $\nu_8$ are the Abbe numbers of the first, second, third, fourth, fifth, sixth, seventh and eight lenses, respectively, and $\Sigma d$ is the sum D of all of the thicknesses and spacings.

The compact wide-angle objective has been found to be especially advantageous for large format cameras, i.e. those which expose a negative with an image format of 90 mm × 120 mm or some other large format camera.

The compact wide-angle objective of the invention is surprisingly short and compact by comparison with wide-angle lenses used heretofore. The combination of a highly compact construction with high image quality to the edge of the image angle of 80 combined with the fact that the wide angle characteristics are retained even at relatively high openings has proven to be of great advantage in large format photography with respect to the ease of working in this medium and the high image quality which is obtained at all distances.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
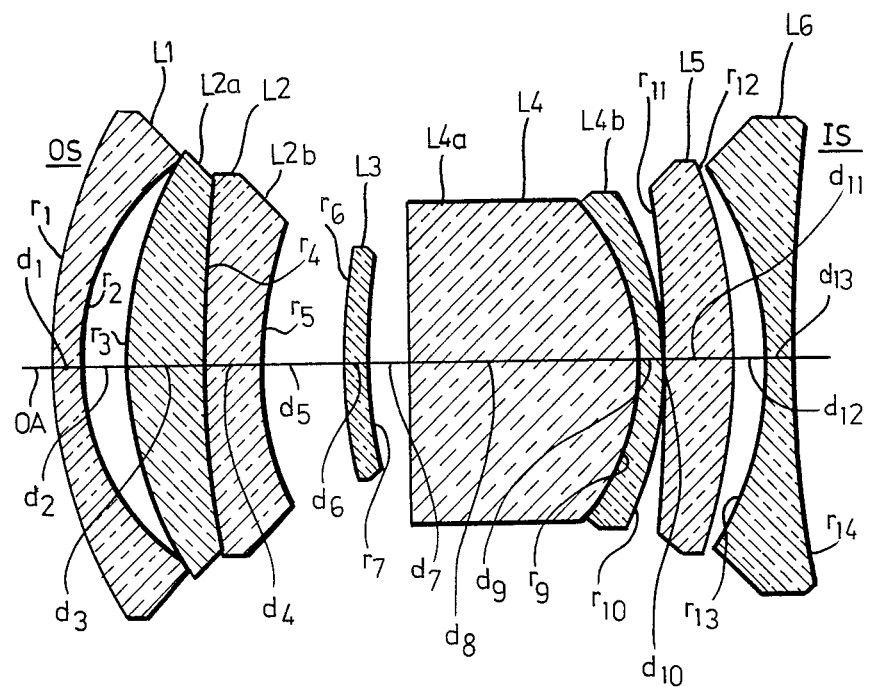
FIG. 1 is a schematic axial section of a compact wide-angle lens according to the invention.

FIG. 1 shows a wide-angle compact objective having an optical axis OA along which are arranged from the object side OS to the image side IS six lens elements and a total of eight lenses.

These include a first lens element L1 of negative refractivity consisting of a single lens with radii of curvature $r_1$ and $r_2$ and a thickness $d_1$ as measured along the axis.

At a spacing $d_2$ from the first lens element L1 is a second lens element L2 consisting of two lenses L2a and L2b which are cemented together. The radii of curvature of these lenses are represented at $r_3$, $r_4$ and $r_5$ and the respective thicknesses are $d_3$ and $d_4$. Both lenses L2a and L2b are positive refracting lenses. At a spacing $d_5$ there follows a third lens element L3, also of positive refractivity and consisting of a single lens with radii $r_6$ and $r_7$ and a thickness of $d_6$.

The fourth positive lens element L4 is separated by a distance $d_7$ from the third element L3 and consists of two cemented positive lenses L4a and L4b with respective radii $r_8$, $r_9$ and $r_{10}$ and thicknesses $d_8$ and $d_9$.

A spacing $d_{10}$ can separate the fifth lens element L5 which is also of positive refractivity from the lens element L4.

The lens element L5 also consisting of a single lens has radii $r_{11}$ and $r_{12}$ and a thickness $d_{11}$.

A spacing $d_{12}$ is provided between the sixth and final lens element L6 and the lens element L5. The lens element L6 is a negative lens with radii $r_{13}$ and $r_{14}$ and a thickness $d_{13}$. The refractive indices of the lenses L1, L2a, L2b, L3, L4a, L4b, L5 and L6 are represented at $n_1$-$n_8$, respectively.

According to the invention, these lenses fulfill the following criteria:

(1) $r_1 > r_2$ (2) $r_{13} < r_{14}$ (3) $n_1 < 1.55$ and $n_8 < 1.55$ (4) $(n_2+n_3+n_4+n_5+n_6+n_7)/6 > 1.62$.

(5) $(d_2+d_{12}) < (d_8+d_9)/2$ (6) $(d_7+d_8+d_9+d_{10}+d_{11}+d_{12}+d_{13}) > 0.48D$

Criteria (1) and (2) concern the first and sixth lens elements L1 and L6 of the system.

For correction of the image field curvature and a uniform image field illumination of a large format objective having an image angle of at least 70° or 80°, the first lens L1 should have a negative refractivity. For correction purposes, a negative meniscus lens L1 is used with a convex curvature turned toward the object side.

For the correction of coma, distortion and transverse color correction over the total image field, a symmetrical refractive index sequencing of the individual lenses is selected for the sequence of individual lenses and lens elements (L1-L6) is not symmetrical itself, the last lens L6 nevertheless having a negative refractivity.

This lens is formed as a biconcave lens (contrast with lens L1) whose radius $r_{14}$ turned toward the image plane is greater than its radius $r_{13}$ turned away from the image plane. This relationship has been found to improve the correction of coma for all openings and for color correction and the correction of color coma over the total image field while the air spacing $d_{13}$ is held to a minimum.

The use of glasses with low refractive index in the outermost negative lenses L1 and L6 (criterion 3) and of high refractivity glasses in all other lenses (criterion 4) has been found to be especially advantageous for the correction of the Petzval sum with simultaneous correction of chromatographic error and all other image defects and allows flattened lens structures or large radii structures in the lens elements L12-L5.

The use of large lens thicknesses for the inner lens elements L2-L5 has been found to be advantageous for correction of systems having large image angles. In conventional wide-angle objectives, this approach has been used close to the diaphragm. For a system of the present type with an image angle of at least 70° or 80°, it suffices to have as the largest thickness element the fourth element L4 ($d_8+d_9$) This provides an advantage of the present system over conventional systems in that the overall weight of the objective is less. Simultaneously it allows the air spaces $d_2$ and $d_{13}$ to be very small (criterion 5) which is important for good correction of image field curvature, coma and chromatographic errors and chromatographic coma even with short object distances.

Known objectives of the wide Gauss type with large air spaces between the outermost negative meniscus lenses and the neighboring positive lens elements show, by comparison to the lenses of the invention, clearly poorer image quality as one moves into the short object-distance ranges.

The limitation of a single very thick lens in the region of the diaphragm and the minimalization of the air spaces $d_2$ and $d_3$ ensure a short axial length of the objective in conjunction with a small diameter of the objective based upon the small diameters of the first and last lens elements L1 and L6, thereby making the objective particularly suitable for large format cameras by comparison with earlier wide angle lenses.

For correction of all image defects, it has been found to be advantageous that the length of the first part of the system formed by the lenses L1-L3 should be similar to that of the second part of the system formed by the elements L4-L6. This is assured by the criterion 6.

Figure 2:
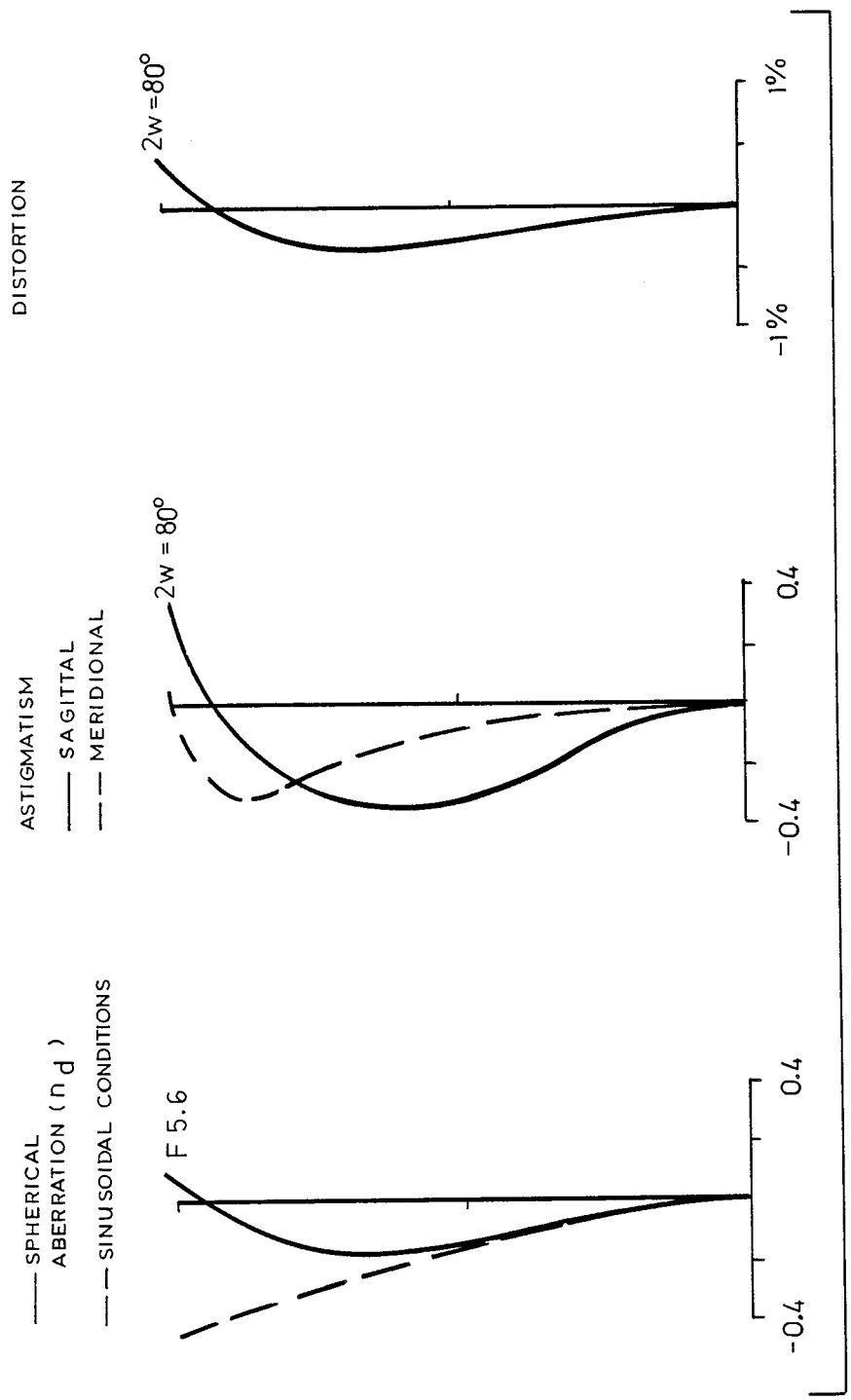
FIG. 2 is a graph showing the spherical aberration, the deviation from a sinosoidal characteristic of the astigmatism and the characteristics of a first embodiment of the invention.
Figure 3:
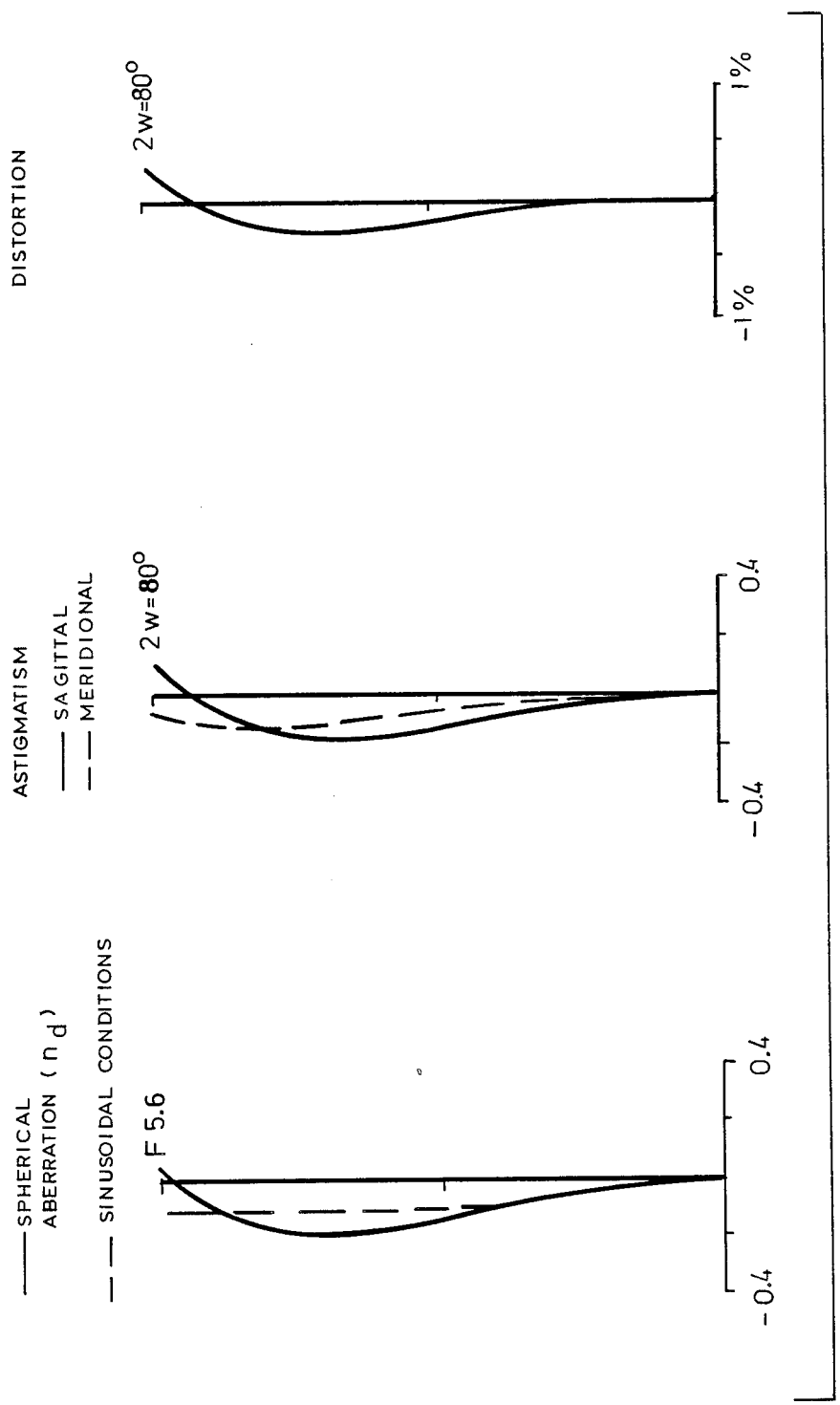
FIG. 3 is a graph similar to FIG. 2 of a second embodiment.

FIGS. 2 and 3 show the image reproduction quality graphically. The first tubular example given herein corresponds to FIG. 2 while FIG. 3 corresponds to the second tabular example herein.

I claim:

1. A wide-angle objective consisting essentially of six elements and eight lenses aligned along an optical axis, said lenses consisting, in succession from an object side, of:

a first element constituted by a convex negative meniscus first lens L1 with radii $r_1$ and $r_2$ and a thickness along said axis of $d_1$ and a refractive index of $n_1$;

a second positive-meniscus element L2 separated from said first element by a spacing $d_2$ measured along said axis and constituted by a second lens L2a cemented to a third lens L3, said second lens L2 being of refractive index $n_2$ and having radii $r_3$ and $r_4$ and a thickness along said axis of $d_3$, said third lens L2b being of refractive index $n_3$ and having radii $r_4$ and $r_5$ and a thickness along said axis of $d_4$;

a third element L3 separated from said second element by a spacing $d_5$ along said axis and constituted by a positive meniscus fourth lens having radii $r_6$ and $r_7$, a refractive index $n_4$, and a thickness along said axis of $d_6$;

a fourth positive element L4 spaced from said third element along said axis by a spacing $d_6$ and constituted of a fifth lens L4a cemented to a sixth lens L6a, said fifth lens L4a having radii $r_8$ and $r_9$ and being of a thickness $d_8$ along said axis and of a refractive index $n_5$, said sixth lens L4b having radii $r_9$ and $r_{10}$ and being a lens with a refractive index $n_6$ and a thickness along said axis of $d_9$;

a fifth positive meniscus element L5 spaced along said axis by a spacing $d_{10}$ from said fourth element and consisting of a seventh lens with a refractive index $n_7$, radii $r_{11}$ and $r_{12}$ and a thickness $d_{11}$ along said axis; and a sixth negative element L6 in the form of an eighth lens of biconcave configuration, separated by a spacing $d_{12}$ along said axis from said fifth element and having a refractive index $n_8$, radii $r_{13}$ and $r_{14}$ and a thickness $d_{13}$ along said axis, and wherein:

said radius $r_{14}$ is greater than the radius $r_{13}$ of said eight lens and is turned toward an image side of the objective, and the following conditions are also satisfied:

$(d_2+d_{12})<(d_8+d_9)/2$, and $(d_7+d_8+d_9+d_{10}+d_{11}+d_{12}+d_{13})>0.48D$ where D is the sum of all of said thicknesses and spacings.

2. The wide-angle objective defined in claim 1, further satisfying the criteria:

$n_1<1.55$ $n_8<1.55$ $(n_2+n_3+n_4+n_5+n_6+n_7)/6>1.62$.

3. The wide-angle lens defined in claim 2 wherein, for a focal length of 100 units the image distance is 81.9 units, the image angle is 70° for an aperture ratio of 1:5.6 and is 80° for an aperture ratio of 1:11.0, and said radii, thicknesses and spacings are given below in said units:

| | | | |
|---|---|---|---|
| $r_1 = 39.152$ | | | |
| | $d_1 = 2.517$ | $n_1 = 1.4645$ | $v_1 = 65.77$ |
| $r_2 = 20.221$ | | | |
| | $d_2 = 3.510$ | | |
| $r_3 = 29.616$ | | | |
| | $d_3 = 6.623$ | $n_2 = 1.7550$ | $v_2 = 52.30$ |
| $r_4 = 87.298$ | | | |
| | $d_4 = 4.967$ | $n_3 = 1.6254$ | $v_3 = 35.56$ |

-continued

| | | | |
|---|---|---|---|
| $r_5 = 29.998$ | | | |
| | $d_5 = 7.000$ | | |
| $r_6 = 48.217$ | | | |
| | $d_6 = 1.987$ | $n_4 = 1.7725$ | $\nu_4 = 49.60$ |
| $r_7 = 55.911$ | | | |
| | $d_7 = 3.312$ | | |
| $r_8 = 321.496$ | | | |
| | $d_8 = 19.312$ | $n_5 = 1.6204$ | $\nu_5 = 60.33$ |
| $r_9 = -19.009$ | | | |
| | $d_9 = 1.987$ | $n_6 = 1.6668$ | $\nu_6 = 33.01$ |
| $r_{10} = -27.981$ | | | |
| | $d_{10} = 0.338$ | | |
| $r_{11} = -117.436$ | | | |
| | $d_{11} = 5.841$ | $n_7 = 1.6204$ | $\nu_7 = 60.33$ |
| $r_{12} = -44.848$ | | | |
| | $d_{12} = 2.583$ | | |
| $r_{13} = -28.475$ | | | |
| | $d_{13} = 2.517$ | $n_8 = 1.4787$ | $\nu_8 = 58.70$ |
| $r_{14} = 131.465$ | | | |
| | $\Sigma d = 62.494$ | | | wherein $\nu_1$ to $\nu_8$ are the Abbe numbers of the first, second, third, fourth, fifth, sixth, seventh and eight lenses, respectively, and $\Sigma d$ is the sum D of all of said thicknesses and spacings.

4. The wide-angle lens defined in claim 2 wherein, for a focal length of 100 units the image distance is 79.98 units, the image angle is 70° for an aperture ratio of 1:5.6 and is 80° for an aperture ratio of 1:11.0, and said radii, thicknesses and spacings are given below in said units:

| | | | |
|---|---|---|---|
| $r_1 = 40.585$ | | | |
| | $d_1 = 2.512$ | $n_1 = 1.4645$ | $\nu_1 = 65.77$ |
| $r_2 = 20.329$ | | | |
| | $d_2 = 2.942$ | | |
| $r_3 = 28.243$ | | | |
| | $d_3 = 6.611$ | $n_2 = 1.7550$ | $\nu_2 = 52.30$ |
| $r_4 = 78.065$ | | | |
| | $d_4 = 4.958$ | $n_3 = 1.6254$ | $\nu_3 = 35.56$ |
| $r_5 = 29.234$ | | | |
| | $d_5 = 6.988$ | | |
| $r_6 = 48.279$ | | | |
| | $d_6 = 1.983$ | $n_4 = 1.7725$ | $\nu_4 = 49.60$ |
| $r_7 = 61.979$ | | | |
| | $d_7 = 3.303$ | | |
| $r_8 = 735.997$ | | | |
| | $d_8 = 19.278$ | $n_5 = 1.6180$ | $\nu_5 = 63.40$ |
| $r_9 = -18.981$ | | | |
| | $d_9 = 1.983$ | $n_6 = 1.6668$ | $\nu_6 = 33.01$ |
| $r_{10} = -27.595$ | | | |
| | $d_{10} = 0.337$ | | |
| $r_{11} = -100.513$ | | | |
| | $d_{11} = 5.831$ | $n_7 = 1.6180$ | $\nu_7 = 63.40$ |
| $r_{12} = -44.952$ | | | |
| | $d_{12} = 2.578$ | | |
| $r_{13} = -27.416$ | | | |
| | $d_{13} = 2.512$ | $n_8 = 1.4645$ | $\nu_8 = 65.77$ |
| $r_{14} = 158.107$ | | | |
| | $\Sigma d = 61.816$ | | | wherein $\nu_1$ to $\nu_8$ are the Abbe numbers of the first, second, third, fourth, fifth, sixth, seventh and eight lenses, respectively, and $\Sigma d$ is the sum D of all of said thicknesses and spacings.

* * * * *